US008581449B2

(12) United States Patent
Tupman et al.

(10) Patent No.: US 8,581,449 B2
(45) Date of Patent: Nov. 12, 2013

(54) PORTABLE POWER SOURCE TO PROVIDE POWER TO AN ELECTRONIC DEVICE VIA AN INTERFACE

(75) Inventors: David John Tupman, San Francisco, CA (US); Doug M. Farrar, Los Altos, CA (US); Joseph R. Fisher, Jr., San Jose, CA (US); Jesse L. Dorogusker, Menlo Park, CA (US); Donald J. Novotney, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 12/878,968

(22) Filed: Sep. 9, 2010

(65) Prior Publication Data

US 2010/0327664 A1 Dec. 30, 2010

Related U.S. Application Data

(63) Continuation of application No. 12/415,763, filed on Mar. 31, 2009, now Pat. No. 7,816,811, which is a continuation of application No. 11/031,547, filed on Jan. 7, 2005, now Pat. No. 7,525,216.

(51) Int. Cl.
*H01H 47/00* (2006.01)
*H02H 3/02* (2006.01)

(52) U.S. Cl.
USPC .......................................................... 307/126

(58) Field of Classification Search
USPC .......................................................... 307/126
See application file for complete search history.

(56) References Cited

U.S. PATENT DOCUMENTS

| 4,257,098 A | 3/1981 | Lacy |
| 4,673,861 A | 6/1987 | Dubovsky et al. |
| 4,850,899 A | 7/1989 | Maynard |
| 4,965,738 A | 10/1990 | Bauer et al. |
| 5,041,025 A | 8/1991 | Haitmanek |
| 5,055,069 A | 10/1991 | Townsend et al. |
| 5,080,603 A | 1/1992 | Mouissie |
| 5,103,156 A | 4/1992 | Jones et al. |
| 5,104,243 A | 4/1992 | Harding |
| 5,108,313 A | 4/1992 | Adams |
| 5,150,031 A | 9/1992 | James et al. |

(Continued)

FOREIGN PATENT DOCUMENTS

| EP | 1 104 150 | 5/2001 |
| EP | 1274151 | 1/2003 |

(Continued)

OTHER PUBLICATIONS

Full English Translation of Japanese Kokai Patent Application #2001-69165A, Takeshi Koura.

(Continued)

*Primary Examiner* — Rexford Barnie
*Assistant Examiner* — Dru Parries
(74) *Attorney, Agent, or Firm* — Kilpatrick Townsend & Stockton LLP

(57) ABSTRACT

A portable power source is configured for use with an electronic device. The portable power source cooperates and communicates with the electronic device via a peripheral bus to which the electronic device is attachable. The portable power source includes circuitry to process a power request signal from the electronic device to determine whether a device connected to a bus interface of the portable power source is requesting power from the portable power source.

31 Claims, 4 Drawing Sheets

(56) References Cited

U.S. PATENT DOCUMENTS

| | | |
|---|---|---|
| 5,186,646 A | 2/1993 | Pederson |
| 5,277,624 A | 1/1994 | Champion |
| 5,295,843 A | 3/1994 | Davis et al. |
| 5,371,456 A | 12/1994 | Brainard |
| 5,402,055 A | 3/1995 | Nguyen |
| 5,471,128 A | 11/1995 | Patino et al. |
| 5,498,950 A | 3/1996 | Ouwerkerk |
| 5,514,945 A | 5/1996 | Jones |
| 5,586,893 A | 12/1996 | Mosquera |
| 5,602,455 A | 2/1997 | Stephens et al. |
| 5,618,045 A | 4/1997 | Kagan et al. |
| 5,648,712 A | 7/1997 | Hahn |
| 5,660,558 A | 8/1997 | Osanai et al. |
| 5,727,866 A | 3/1998 | Kraines et al. |
| 5,752,046 A | 5/1998 | Oprescu et al. |
| 5,754,027 A | 5/1998 | Oglesbee et al. |
| 5,830,001 A | 11/1998 | Kinoshita |
| 5,845,217 A | 12/1998 | Lindell et al. |
| 5,859,522 A | 1/1999 | Theobald |
| 5,901,049 A | 5/1999 | Schmidt et al. |
| 5,902,154 A | 5/1999 | Nakata |
| 5,932,989 A | 8/1999 | Thandiwe et al. |
| 5,955,869 A | 9/1999 | Rathmann |
| 5,964,879 A | 10/1999 | Dunstan et al. |
| 5,975,957 A | 11/1999 | Noda et al. |
| 6,007,372 A | 12/1999 | Wood |
| 6,012,105 A | 1/2000 | Rubbmark et al. |
| 6,025,695 A | 2/2000 | Friel et al. |
| 6,031,797 A | 2/2000 | Van Ryzin et al. |
| 6,053,773 A | 4/2000 | Wu |
| 6,087,804 A | 7/2000 | Suda |
| 6,125,455 A | 9/2000 | Yeo |
| 6,130,518 A | 10/2000 | Gabehart et al. |
| 6,139,373 A | 10/2000 | Ward et al. |
| 6,152,778 A | 11/2000 | Dalton |
| 6,154,773 A | 11/2000 | Roberts et al. |
| 6,154,798 A | 11/2000 | Lin et al. |
| 6,169,387 B1 | 1/2001 | Kaib |
| 6,178,514 B1 | 1/2001 | Wood |
| 6,184,652 B1 | 2/2001 | Yang |
| 6,184,655 B1 | 2/2001 | Malackowski |
| 6,194,866 B1 | 2/2001 | Olsson |
| 6,203,345 B1 | 3/2001 | Roque et al. |
| 6,204,637 B1 | 3/2001 | Rengan |
| 6,206,480 B1 | 3/2001 | Thompson |
| 6,211,581 B1 | 4/2001 | Farrant |
| 6,211,649 B1 | 4/2001 | Matsuda |
| 6,224,420 B1 | 5/2001 | Nishio et al. |
| 6,234,827 B1 | 5/2001 | Nishio et al. |
| 6,252,380 B1 | 6/2001 | Koenck |
| 6,261,109 B1 | 7/2001 | Liu et al. |
| 6,267,623 B1 | 7/2001 | Hisamatsu |
| 6,271,605 B1 | 8/2001 | Carkner et al. |
| 6,280,251 B1 | 8/2001 | Nishio et al. |
| 6,283,789 B1 | 9/2001 | Tsai |
| 6,304,764 B1 | 10/2001 | Pan |
| 6,314,479 B1 | 11/2001 | Frederick et al. |
| 6,316,916 B2 | 11/2001 | Bohne |
| 6,319,061 B1 | 11/2001 | Chen et al. |
| 6,322,396 B1 | 11/2001 | Kuan |
| 6,344,727 B1 | 2/2002 | Desai et al. |
| 6,353,894 B1 | 3/2002 | Pione |
| 6,354,713 B1 | 3/2002 | Leifer et al. |
| 6,358,089 B1 | 3/2002 | Kuroda et al. |
| 6,392,414 B2 | 5/2002 | Bertness |
| 6,431,915 B1 | 8/2002 | Ko |
| 6,453,371 B1 | 9/2002 | Hampson et al. |
| 6,454,592 B2 | 9/2002 | Takagi |
| 6,461,173 B1 | 10/2002 | Mizuno et al. |
| 6,464,542 B1 | 10/2002 | Lee |
| 6,468,110 B2 | 10/2002 | Fujino et al. |
| 6,478,603 B1 | 11/2002 | Wu |
| 6,483,428 B1 | 11/2002 | Fish et al. |
| 6,485,328 B1 | 11/2002 | Wu |
| 6,489,751 B2 | 12/2002 | Small et al. |
| 6,512,682 B2 | 1/2003 | Cohen et al. |
| 6,524,119 B2 | 2/2003 | Kato et al. |
| 6,526,516 B1 | 2/2003 | Ishikawa et al. |
| 6,577,877 B1 | 6/2003 | Charlier et al. |
| 6,589,076 B1 | 7/2003 | Davis et al. |
| 6,591,085 B1 | 7/2003 | Grady |
| 6,608,264 B1 | 8/2003 | Fouladpour |
| 6,608,399 B2 | 8/2003 | McConnell et al. |
| 6,614,232 B1 | 9/2003 | Mukai |
| 6,616,473 B2 | 9/2003 | Kamata et al. |
| 6,629,197 B1 | 9/2003 | Bhogal et al. |
| 6,642,629 B2 | 11/2003 | Deleeuw |
| 6,653,813 B2 | 11/2003 | Khatri |
| 6,663,420 B1 | 12/2003 | Xiao |
| 6,674,995 B1 | 1/2004 | Meyers et al. |
| 6,722,924 B1 | 4/2004 | Zhou et al. |
| 6,725,061 B1 | 4/2004 | Hutchison, IV et al. |
| 6,728,546 B1 | 4/2004 | Peterson et al. |
| 6,745,267 B2 | 6/2004 | Chen et al. |
| 6,747,859 B2 | 6/2004 | Walbeck et al. |
| 6,754,468 B1 | 6/2004 | Sieben et al. |
| 6,776,626 B2 | 8/2004 | Huang et al. |
| 6,776,660 B1 | 8/2004 | Kubota et al. |
| 6,776,665 B2 | 8/2004 | Huang |
| 6,799,226 B1 | 9/2004 | Robbin et al. |
| 6,813,528 B1 | 11/2004 | Yang |
| 6,816,376 B2 | 11/2004 | Bright et al. |
| 6,830,160 B2 | 12/2004 | Risolia |
| 6,854,984 B1 | 2/2005 | Lee et al. |
| 6,859,854 B2 | 2/2005 | Kwong |
| 6,869,290 B2 | 3/2005 | Brown et al. |
| 6,895,280 B2 | 5/2005 | Meadows et al. |
| 6,931,456 B2 | 8/2005 | Payne et al. |
| 6,936,936 B2 | 8/2005 | Fischer et al. |
| 6,939,177 B2 | 9/2005 | Kato et al. |
| 6,969,970 B2 | 11/2005 | Dias et al. |
| 6,991,483 B1 | 1/2006 | Milan et al. |
| 6,995,963 B2 | 2/2006 | Fadell et al. |
| 7,004,787 B2 | 2/2006 | Milan |
| 7,021,971 B2 | 4/2006 | Chou et al. |
| 7,050,783 B2 | 5/2006 | Curtiss et al. |
| 7,054,981 B2 | 5/2006 | Fadell et al. |
| 7,062,261 B2 | 6/2006 | Goldstein et al. |
| 7,108,560 B1 | 9/2006 | Chou et al. |
| 7,125,287 B1 | 10/2006 | Chou et al. |
| 7,126,241 B2 | 10/2006 | Popescu-Stanesti et al. |
| 7,127,678 B2 | 10/2006 | Bhesania et al. |
| 7,127,879 B2 | 10/2006 | Zhu et al. |
| 7,128,617 B2 | 10/2006 | Wang et al. |
| 7,186,147 B1 | 3/2007 | Chou et al. |
| 7,215,042 B2 | 5/2007 | Yan |
| 7,329,153 B2 | 2/2008 | Lin et al. |
| 7,525,216 B2 | 4/2009 | Tupman et al. |
| 7,536,565 B2 | 5/2009 | Girish et al. |
| 7,593,782 B2 | 9/2009 | Jobs et al. |
| 7,650,507 B2 | 1/2010 | Crandall et al. |
| 7,823,214 B2 | 10/2010 | Rubinstein et al. |
| 7,856,564 B2 | 12/2010 | Girish et al. |
| 7,865,745 B2 | 1/2011 | Girish et al. |
| 7,889,497 B2 | 2/2011 | Jobs et al. |
| 2001/0003205 A1 | 6/2001 | Gilbert |
| 2001/0005641 A1 | 6/2001 | Matsumoto et al. |
| 2001/0006884 A1 | 7/2001 | Matsumoto |
| 2002/0002035 A1 | 1/2002 | Sim et al. |
| 2002/0010759 A1 | 1/2002 | Hitson et al. |
| 2002/0029303 A1 | 3/2002 | Nguyen |
| 2002/0065074 A1 | 5/2002 | Cohn et al. |
| 2002/0068610 A1 | 6/2002 | Anvekar et al. |
| 2002/0072390 A1 | 6/2002 | Uchiyama |
| 2002/0103008 A1 | 8/2002 | Rahn et al. |
| 2002/0105861 A1 | 8/2002 | Leapman |
| 2002/0115480 A1 | 8/2002 | Huang |
| 2002/0132651 A1 | 9/2002 | Jinnouchi |
| 2002/0151327 A1 | 10/2002 | Levitt |
| 2002/0156546 A1 | 10/2002 | Ramaswamy |
| 2002/0156949 A1 | 10/2002 | Kubo et al. |
| 2002/0173273 A1 | 11/2002 | Spurgat et al. |
| 2003/0028664 A1 | 2/2003 | Tan et al. |
| 2003/0041206 A1 | 2/2003 | Dickie |

(56) References Cited

U.S. PATENT DOCUMENTS

| | | |
|---|---|---|
| 2003/0059022 A1 | 3/2003 | Nebiker et al. |
| 2003/0067741 A1 | 4/2003 | Alfonso et al. |
| 2003/0073432 A1 | 4/2003 | Meade |
| 2003/0076301 A1 | 4/2003 | Tsuk et al. |
| 2003/0079038 A1 | 4/2003 | Robbin et al. |
| 2003/0095096 A1 | 5/2003 | Robbin et al. |
| 2003/0097379 A1 | 5/2003 | Ireton |
| 2003/0110403 A1 | 6/2003 | Crutchfield et al. |
| 2003/0172209 A1 | 9/2003 | Liu et al. |
| 2003/0198015 A1 | 10/2003 | Vogt |
| 2003/0205995 A1 | 11/2003 | Odaohhara et al. |
| 2003/0220988 A1 | 11/2003 | Hymel |
| 2003/0236075 A1 | 12/2003 | Johnson et al. |
| 2004/0026516 A1 | 2/2004 | Liu et al. |
| 2004/0027812 A1 | 2/2004 | Yen |
| 2004/0039860 A1 | 2/2004 | Mills et al. |
| 2004/0048569 A1 | 3/2004 | Kawamura |
| 2004/0082369 A1 | 4/2004 | Dayan et al. |
| 2004/0090998 A1 | 5/2004 | Chen |
| 2004/0103223 A1 | 5/2004 | Gabehart et al. |
| 2004/0117518 A1 | 6/2004 | Fadell et al. |
| 2004/0143771 A1* | 7/2004 | Minabe et al. ............... 713/300 |
| 2004/0162029 A1 | 8/2004 | Grady |
| 2004/0182938 A1 | 9/2004 | Chen et al. |
| 2004/0186935 A1 | 9/2004 | Bell et al. |
| 2004/0194154 A1 | 9/2004 | Meadors et al. |
| 2004/0198436 A1 | 10/2004 | Alden |
| 2004/0224638 A1 | 11/2004 | Fadell et al. |
| 2004/0225804 A1 | 11/2004 | Leete |
| 2004/0235339 A1 | 11/2004 | Sato et al. |
| 2004/0267825 A1 | 12/2004 | Novak et al. |
| 2005/0014119 A1 | 1/2005 | Rudakov |
| 2005/0014531 A1 | 1/2005 | Findikli |
| 2005/0014536 A1 | 1/2005 | Grady |
| 2005/0022212 A1 | 1/2005 | Bowen |
| 2005/0084721 A1 | 4/2005 | Ikuma et al. |
| 2005/0207726 A1 | 9/2005 | Chen |
| 2005/0239433 A1 | 10/2005 | Watanabe et al. |
| 2006/0184456 A1 | 8/2006 | De Janasz |
| 2007/0086724 A1 | 4/2007 | Grady et al. |
| 2007/0123207 A1 | 5/2007 | Terlizzi |
| 2009/0083834 A1 | 3/2009 | Rubinstein et al. |
| 2011/0061113 A1 | 3/2011 | Rubinstein et al. |
| 2011/0090645 A1 | 4/2011 | Jobs et al. |

FOREIGN PATENT DOCUMENTS

| | | |
|---|---|---|
| EP | 1672613 A2 | 6/2006 |
| GB | 2405718 A | 9/2005 |
| JP | Hei08-152945 | 6/1996 |
| JP | 10-321302 | 12/1998 |
| JP | 10-334993 | 12/1998 |
| JP | 11-288420 | 10/1999 |
| JP | 2000-214953 | 8/2000 |
| JP | 2000-223216 | 8/2000 |
| JP | 2000-223218 | 8/2000 |
| JP | 2001-035603 | 2/2001 |
| JP | 2001-69165 A | 3/2001 |
| JP | 2001-196133 | 7/2001 |
| JP | 2001-230021 | 8/2001 |
| JP | 2001-332350 | 11/2001 |
| JP | 2002-025720 | 1/2002 |
| JP | 2002-203641 | 7/2002 |
| JP | 2002 245719 | 8/2002 |
| JP | 2002-252566 | 9/2002 |
| JP | U3090747 | 10/2002 |
| JP | 2002-342659 | 11/2002 |
| JP | 2002-374447 | 12/2002 |
| JP | 2003-17165 | 1/2003 |
| JP | 2003-032351 | 1/2003 |
| JP | 2003-274386 | 9/2003 |
| KR | 2001-0096564 | 11/2001 |
| WO | WO 99/26330 | 5/1999 |
| WO | WO 00/39907 | 7/2000 |
| WO | WO 00/60450 | 10/2000 |
| WO | WO 02/49314 | 6/2002 |
| WO | WO 03/036541 | 5/2003 |
| WO | WO 03/036957 A1 | 5/2003 |
| WO | WO 03/073688 | 9/2003 |
| WO | WO 2004/084413 | 9/2004 |
| WO | WO 2005/119463 A2 | 12/2005 |
| WO | WO 2006/073702 A1 | 7/2006 |
| WO | WO 2006/073891 A2 | 7/2006 |
| WO | WO 2006/073891 A3 | 7/2006 |

OTHER PUBLICATIONS

"Introduction to Public Key Cryptography," Oct. 9, 1998, printed from http://developer.netscape.com/docs/manuals/security/pkin/contents.htm on Oct. 6, 2004.

Brentrup, "Introduction to Public Key Cryptography Demystified," Campus Technology, printed from http://www.campus-technology.com/article.asp?id=7626 on Oct. 6, 2004.

Whittle, "Public Key Authentication Framework: Tutorial," First Principles Consulting, Jun. 2, 1996.

Belkin iPod Voice Recorder, Product Specification Sheet, printed Jun. 16, 2004.

"A Serial Bus on Speed Diagram: Getting Connected with FireWire", downloaded Oct. 16, 2001, PC Magazine: PC Tech (A Serial Bus on Speed), wysiwyg://51/http://www.zdnet.com/pctech/content/18/10/tu1810.007.html.

"Cables to Go", download Oct. 16, 2001, http://www.cablestogo.com/product.asp?cat%5Fid=601&sku=27028.

"ExpressBus.TM. FU010 User Guide Packing Checklist", Belkin Components.

"FireWire Connector", downloaded Oct. 16, 2001, wysiwyg://76/http://developer.apple.com/...es/Macintosh.sub.--CPUs-G3/ibo-ok/ibook-27.html.

"FireWire", downloaded Oct. 16, 2001, wysiwyg://42/http://developer.apple.com/hardware/FireWire.

"How to Connect Your Computer, PC Hardware", downloaded Oct. 16, 2001, http:///www.scar.utoronto.ca/.about.ccweb/faculty/connect-howto.html.

"IEEE 1394/USB Comparison", downloaded Oct. 16, 2001, www.genitech.com.au/LIBRARY/TechSupport/infobits/firewire.sub.--vs.sub.---usb.htm.

"Making USB Work", downloaded Oct. 16, 2001, PC Magazine: PC Tech (Making USB Work) wysiwyg://55/http://www.zdnet.com/pcmag/pctech/content/18/04/tu-1804.001.html.

"PMC FW2 IEEE1394 FireWire Controller", downloaded Oct. 16, 2001, http://www.bvmltd.co.uk/PMCfw2ds.html.

"Why FireWire is Hot!Hot!Hot!", downloaded Oct. 16, 2001, "Impact.FireWire.SideBar", http://www.vxm.com/21R.35.html.

Charles Severance, "FireWire Finally Comes Home", Computer, Nov. 1998, pp. 117-118.

Ian Fried, "FireWire poised to become ubiquitous", downloaded Oct. 16, 2001, CNETNews.com, 1394 Trade Association: Press, wysiwyg://32/http://1394ta.org/Press/2001Press/august/8.27.b.html.

Ian Fried, "New FireWire to blaze faster trail", downloaded Oct. 16, 2001, CNETNews.com. http://news.cnet.com/news/0-1006-200-6021210.html.

Michael D. Johas Teener, "Understanding FireWire: The IEEE 1394 Standards and Specifications", downloaded Oct. 16, 2001, wysiwyg://9/http://www.chipcenter.com/networking/ieee1394/main.html.

International Search Report in PCT Application PCT/US05/024906 dated Mar. 15, 2006.

International Search Report in PCT Application PCT/US02/33856 dated Mar. 14, 2003.

Menezes et al., "Handbook of applied cryptography," Identification and Entity Authentication, pp. 385-424.

Derman, Glenda, "Monitors Make Net Connections," *Electronic Engineering Times*, vol. 933, 1996, pp. 60 and 69.

Lewis, Peter, "On Technology." Fortune Magazine, Decmeber 9, 2002.

"ipodDock/iPod Cradle," www.bookendzdocks.com/bookendz/dock_cradle.htm, downloaded Feb. 27, 2003.

(56) References Cited

OTHER PUBLICATIONS

"Neuros MP3 Digital Audio Computer," www.neurosaudio.com, dowloaded Apr. 9, 2003.

Sinitsyn, Alexander, "Synchronization Framework for Personal Mobile Servers," *Pervasive Computing and Communications Workshops* (PERCOMW'04), Proceedings of the Second IEEE Annual Conference, Piscataway, NJ, USA, IEEE, Mar. 14, 2004, pp. 208-212.

Bindra, Ashok, "Standard Turns Monitor into I/O Hub," *Electronic Engineering Times*, vol. 918, Sep. 6, 1996, p. 14.

International Search Report dated Aug. 20, 2004 from PCT Application No. PCT/US2004/08686.

International Search Report dated May 21, 2007 from PCT Application No. PCT/US2006/048670.

"MVP Music Profile Specification Revision 1.00" Internet Citation [online] (Jan. 7, 2004) URL:http//www.osta.org/mpv/public/specs/MPVMusic-Prof-Spec-1.00.pdf> [retrieved Jun. 20, 2006] the whole document.

U.S. Appl. No. 10/125,893, filed Apr. 18, 2002 entitled Power Adapters for Powering and/or Charging Peripheral Devices.

Non-Final Office Action for U.S. Appl. No. 10/125,893, mailed Nov. 3, 2004.

Final Office Action for U.S. Appl. No. 10/125,893, mailed May 17, 2005.

Non-Final Office Action for U.S. Appl. No. 10/125,893, mailed Dec. 14, 2005.

Final Office Action for U.S. Appl. No. 10/125,893, mailed Jun. 5, 2006.

Non-Final Office Action for U.S. Appl. No. 10/125,893, mailed Mar. 13, 2007.

Final Office Action for U.S. Appl. No. 10/125,893, mailed Nov. 13, 2007.

Non-Final Office Action for U.S. Appl. No. 10/125,893, mailed Sep. 17, 2008.

Final Office Action for U.S. Appl. No. 10/125,893, mailed Apr. 27, 2009.

Office Action for U.S. Appl. No. 10/278,752, mailed Jun. 13, 2005.

Notice of Allowance for U.S. Appl. No. 10/278,752, mailed on Aug. 25, 2005.

Non-Final Office Action for U.S. Appl. No. 12/415,763, mailed Sep. 4, 2009.

Final Office Action for U.S. Appl. No. 12/415,763, mailed Mar. 10, 2010.

Notice of Allowance for U.S. Appl. No. 12/415,763, mailed Jul. 1, 2010.

Non-Final Office Action for U.S. Appl. No. 11/031,547, mailed May 14, 2008.

Notice of Allowance for U.S. Appl. No. 11/031,547, mailed Dec. 22, 2008.

Non-Final Office Action for U.S. Appl. No. 11/031,288, mailed Jun. 15, 2007.

Non-Final Office Action for U.S. Appl. No. 11/031,288, mailed Feb. 6, 2008.

Final Office Action for U.S. Appl. No. 11/031,288, mailed Oct. 15, 2008.

Notice of Allowance for U.S. Appl. No. 11/031,288, mailed Apr. 16, 2009.

Non-Final Office Action for U.S. Appl. No. 11/031,301, mailed May 4, 2006.

Non-Final Office Action for U.S. Appl. No. 11/031,301, mailed May 30, 2007.

Final Office Action for U.S. Appl. No. 11/031,301, mailed Feb. 22, 2008.

Non-Final Office Action for U.S. Appl. No. 10/833,689, mailed Oct. 4, 2006.

Non-Final Office Action for U.S. Appl. No. 10/833,689, mailed Jun. 20, 2007.

Non-Final Office Action for U.S. Appl. No. 10/833,689, mailed Dec. 28, 2007.

Notice of Allowance for U.S. Appl. No. 10/833,689, mailed Jun. 26, 2008.

\* cited by examiner

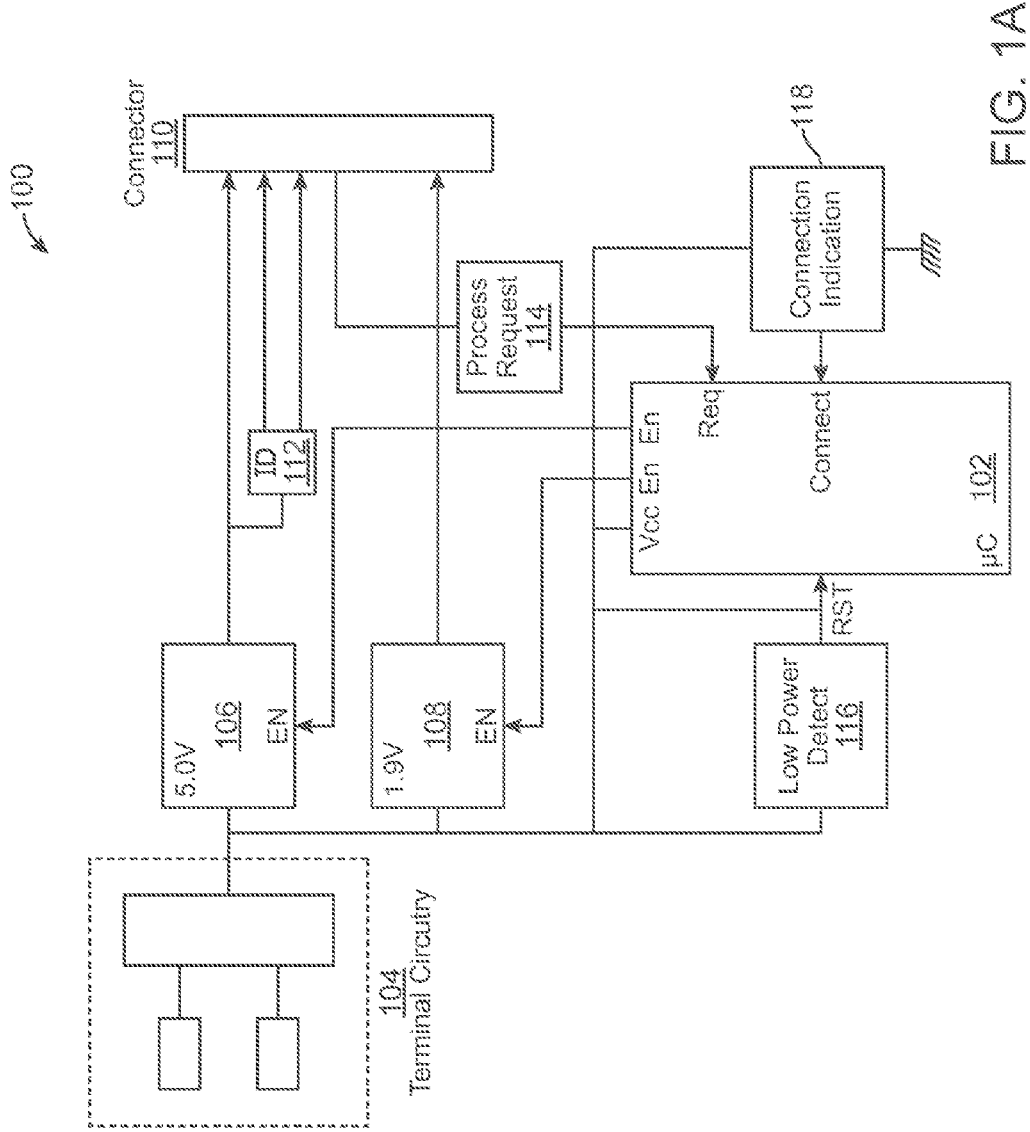

PORTABLE POWER SOURCE TO PROVIDE POWER TO AN ELECTRONIC DEVICE VIA AN INTERFACE

CROSS-REFERENCES TO RELATED APPLICATIONS

The present application claims priority from and is a continuation application of U.S. application Ser. No. 12/415,763 entitled "PORTABLE POWER SOURCE TO PROVIDE POWER TO AN ELECTRONIC DEVICE VIA AN INTERFACE" filed Mar. 31, 2009, which is a continuation of U.S. application Ser. No. 11/031,547 (now U.S. Pat. No. 7,525,216), entitled "PORTABLE POWER SOURCE TO PROVIDE POWER TO AN ELECTRONIC DEVICE VIA AN INTERFACE" filed Jan. 7, 2005, the entire contents of both of which are herein incorporated by reference for all purposes.

This application is also related to: (i) U.S. Provisional Patent Application No.: 60/642,276, APLIP 356P, filed Jan. 7, 2005, entitled "PORTABLE MEDIA DEVICE AND IMPROVED PLAYLIST PROCESSING ON MEDIA DEVICES," which is hereby incorporated herein by reference; (ii) U.S. Provisional Patent Application No.: 60/642,340, APLIP 344P, filed Jan. 7, 2005, entitled "ACCESSORY AUTHENTICATION FOR ELECTRONIC DEVICES," which is hereby incorporated herein by reference; (iii) U.S. patent application Ser. No.: 11/031,288 APLIP 321, filed Jan. 7, 2005, entitled "METHOD AND SYSTEM FOR DISCOVERING A POWER SOURCE ON A PERIPHERAL BUS," which is hereby incorporated herein by reference; (iv) U.S. patent application Ser. No.: 11/031,301, filed Jan. 7, 2005, entitled "CONNECTOR SYSTEM," which is hereby incorporated herein by reference; (v) U.S. patent application Ser. No.: 10/833689, filed Apr. 27, 2004, entitled "CONNECTOR INTERFACE SYSTEM FOR MULTI-COMMUNICATION DEVICE," which is hereby incorporated herein by reference; (vi) U.S. patent application Ser. No.: 10/278,752, filed Oct. 22, 2002, entitled "METHODS AND APPARATUS FOR CHARGING A BATTERY IN A PERIPHERAL DEVICE," which is hereby incorporated herein by reference; (vii) U.S. patent application Ser. No.: 10/125,893, filed Mar. 18, 2002, entitled "POWER ADAPTERS FOR POWERING AND/OR CHARGING PERIPHERAL DEVICES," which is hereby incorporated herein by reference.

BACKGROUND

1. Technical Field

The present patent application relates to portable power sources and, in particular, relates to a portable power source operable to selectively provide power to a device connected to an interface of the portable power source.

2. Description of the Related Art

Portable electronic devices, such as Portable Digital Assistants and media players, typically include one or more rechargeable batteries housed permanently (or somewhat permanently) within the portable electronic device. These portable electronic devices sometimes also have peripheral bus ports that are able to support peripheral buses, such as Universal Serial Bus (USB) or FIREWIRE (IEEE 1394) bus ports. Peripheral buses are used to provide data communications with electronic devices as well as to provide limited amounts of power to the electronic devices. The power typically originates from a host computer to which the electronic device is connected via the peripheral bus.

In some situations, it can be impossible, or very inconvenient, to recharge the internally-housed batteries of a portable electronic device. This is typically due to lack of access to a suitable source of power. For example, many airliners do not have available a source of power suitable to recharge batteries of portable electronic devices.

On the other hand, external batteries (e.g., disposable AA batteries) can be somewhat easily obtained and carried to operate a portable electronic device in situations where the internally-housed rechargeable batteries are discharged and a source of recharge power is not conveniently available. However, configuring a portable electronic device to accommodate the use of both external batteries and internally-housed rechargeable batteries can be detrimental to the portability of the device.

Thus, there is a desire to accommodate the use of external batteries with portable electronic devices, while minimizing the detrimental effect to the portability of the electronic devices.

SUMMARY

Broadly speaking, in accordance with one aspect, a portable power source is configured for use with an electronic device.

The portable power source cooperates and communicates with the electronic device via an interface to which the electronic device is coupled. The portable power source includes circuitry to process a power request signal from the electronic device to determine whether a device connected to an interface of the portable power source is requesting power from the portable power source.

Typically, even if the connected electronic device has an internally-housed rechargeable battery, the internally-housed battery may be completely discharged. Thus, in accordance with some aspects, under some conditions, the portable power source provides power to the electronic device for at least a predetermined amount of time without consideration of the power request signal. The electronic device can use the power provided from the portable power source during this predetermined amount of time to boot up or otherwise arrive at a steady state condition, if not already at a steady state condition, so the electronic device can definitively determine whether to provide the power request signal to the portable power source.

An example of a condition under which the portable power source may provide power to the electronic device without consideration of the power request signal includes an initialization condition, in which the portable power source is unaware of the state of the electronic device.

An initialization condition may include, for example, a condition when electronic device is first connected to the portable power source after being not connected or, regardless of whether the electronic device is already connected to the portable power source, when external batteries are first inserted into the portable power source.

This summary is not intended to be all-inclusive. Other aspects will become apparent from the following detailed description taken in conjunction with the accompanying drawings, as well as from the appended claims.

BRIEF DESCRIPTION OF THE DRAWINGS

FIG. 1A illustrates a more detailed block diagram of a portable power source in accordance with an aspect.

DETAILED DESCRIPTION

A portable power source, particularly suitable for use with an electronic device, is now described. Examples and aspects are discussed below with reference to FIGS. 1, 2 and 3. However, it should be understood that the detailed description given herein with respect to these figures is for explanatory purposes only, and not by way of limitation.

Figure 1:
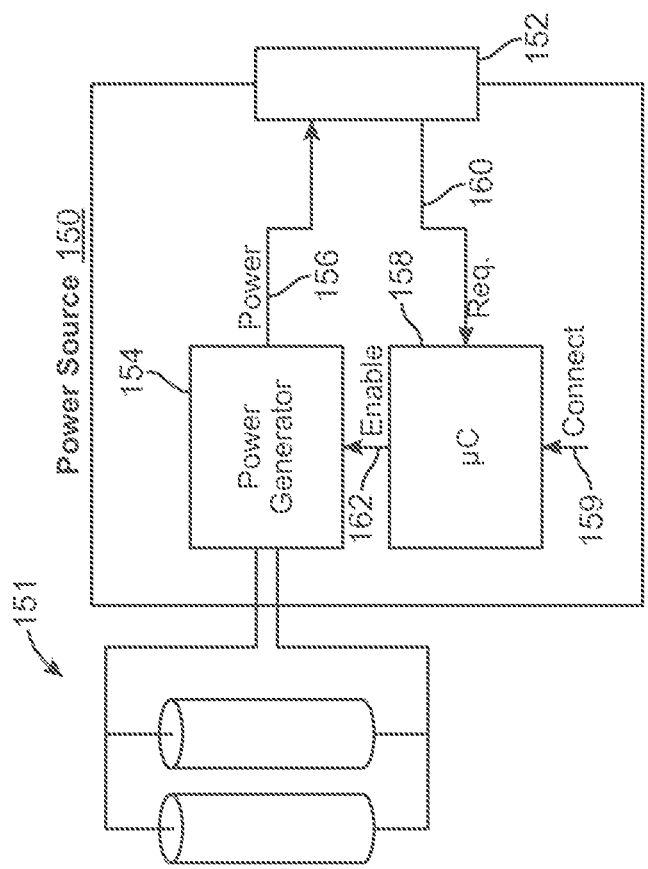
FIG. 1 illustrates a block diagram of a portable power source in accordance with an aspect.

FIG. 1 is a block schematic diagram of a portable power source 150 in accordance with one aspect. Referring to FIG. 1, external batteries 151 provide a renewable source of power for the power generator 154 to generate a power signal 156. The power signal 156 is provided to an interface 152. A microcontroller 158 is configured to receive a "connect" signal that indicates whether an electronic device is connected to the power source 150. The microcontroller 158 is also configured to receive a "request" signal that indicates whether a connected electronic device is requesting that the power signal 156 be provided to the electronic device. Based on the request signal 160 and the connect signal 159, the microcontroller 158 controls the state of an enable signal 162 provided to the power generator 154. The power generator 154 operates in consideration of the state of the enable signal 162.

FIG. 1A is a more detailed block schematic diagram of a portable power source 100 in accordance with an aspect. Before discussing the block schematic diagram of FIG. 1, however, it is useful to consider the system diagram in FIG. 3.

Figure 3:
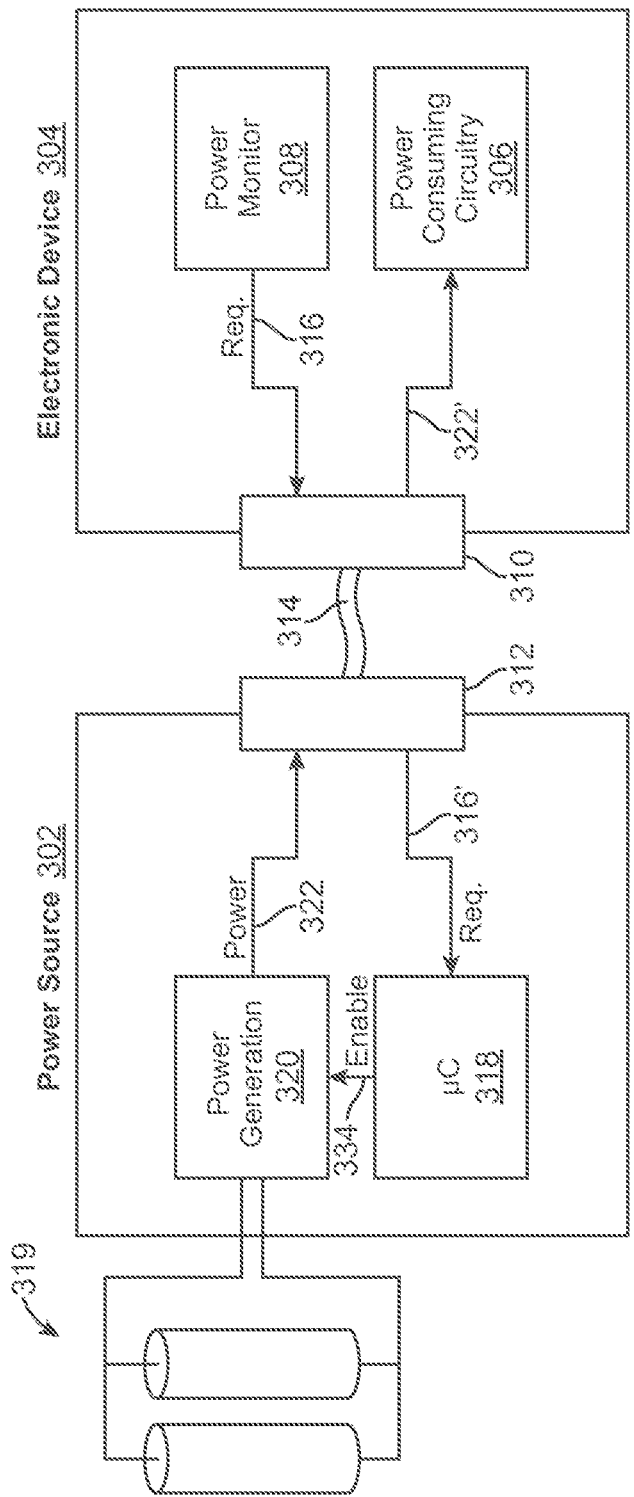
FIG. 3 illustrates a power source at a relatively high level, with an electronic device connected to it.

In particular, FIG. 3 illustrates the power source 100 (referred to in FIG. 3 by reference numeral 302) in the context of an electronic device 304 that is connected to receive power from the power source to power the operation of the electronic device 304. Looking first at the electronic device 304, the electronic device receives a DC power signal 322' (which, as will be discussed in a moment, originates as DC power signal 322 from the power source 302) via an interface connector 310. The interface connector 314 is connected to a counterpart interface connector 312 in the power source 302 by a cable 314.

Various configurations for the interface from the power source 302 may be employed. In FIG. 3, the configuration includes the interface connector 314, the counterpart interface connector 312 and the cable 314. In one example, either of the interface connectors 312 or 314 may not be present, and may be replaced by a more permanent connection.

Furthermore, in some examples, regardless of how many connectors are present, the interface may be a controlled interface, such as a Universal Serial Bus (USB) or Firewire (IEEE 1394) bus interface. In other examples, there may be little or no logic directly associated with it the interface.

Power consuming circuitry 306 in the electronic device 304 operates using the DC power signal 322'. A power monitor 308 monitors the power requirements of the consuming circuitry 306 and, when appropriate, generates a request signal 316 to request the power source 302 to provide the DC power signal 322. The request signal 316 is provided to the power source 302 via the interface connector 310 and cable 314.

A microcontroller 318 in the power source 302 receives the power request signal 316 as power request signal 316', via the interface connector 312 of the power source 302. In response to the power request signal 316', the microcontroller 302 provides an enable signal 324 to power generation circuitry 320 of the power source 302, which provides the generated power signal 322 to the interface connector 312. The power generation circuitry 320 generates the power signal 322 using power supplied from external batteries 319 connected to the power generation circuitry 320, and the power signal 322 is provided to the electronic device 304 via the cable 314 and interface connector 310.

Having considered the FIG. 3 system diagram of a power source and connected electronic device, we now consider the FIG. 1 block circuit diagram of the portable power source 100. In the manner discussed above with reference to FIG. 3, the portable power source 100 is connectable to an electronic device (not shown) via a connector 110. The connecter 110 provides an interface from the portable power source 100 to a port of a detachable electronic device.

The portable power source 100 includes a microcontroller 102 configured to control and coordinate the operation of various components of the portable power source 100. The portable power source further includes terminal circuitry 104 (terminals and associated circuitry) to receive power from, in the FIG. 1 example, two replaceable AA batteries. In the FIG. 1 example, circuitry 106 is provided to generate 5V power from the battery output, and circuitry 108 is provided to generate a 1.9V output from the battery output. The circuitry 106 and circuitry 108 operate based on the state of enable output signals from the microcontroller 102.

The circuitry 106 is coupled to provide the 5V power to a supply voltage pin (for example, to carry a "supply voltage" as defined by a USB interface standard) of the connector 110. The circuitry 108 is coupled to provide the 1.9V power on an additional power line pin of the connector 110. The "additional power line pin" may be, for example, a pin to carry a signal that is supplemental to the signals defined by the USB interface standard. For additional details on connectors having additional functionality, see U.S. patent application Ser. No.: 11/031,301, filed Jan. 7, 2005, entitled "CONNECTOR SYSTEM," referred to above in the "CROSS-REFERENCE TO RELATED APPLICATIONS" section.

While the FIG. 1 block schematic diagram illustrates two power generation circuitry 106 and 108, generating 5V and 1.9V, respectively, the number of voltages, and their values, would generally be compatible with particular electronic devices expected to be connected to receive power from the power source 100 to power the operation of the electronic device 304

Referring still to FIG. 1, circuitry 112 generates signal(s) coupled to data lines (for example, the "data lines" defined by the USB interface standard) in the connector 110. The generated signal(s) characterize the portable power source 100 to a connected electronic device. The generated signal(s) may comprise, for example, an "available power indicator" of the type disclosed in related patent application Ser. No. 10/961, 776.

Circuitry 114 processes a request signal from the electronic device, provided to the portable power source 100 via the connector 110, and provides an indication thereof to a "request" input of the microcontroller 102. The request signal from the electronic device indicates whether the electronic device is requesting power (i.e., the 5V and 1.9 V power generated by circuitry 106 and 108, respectively) from the portable power source 100.

Circuitry 118 generates a signal, to a "connect" input of the microcontroller 102, that indicates whether an electronic device is connected to the connector 110. While an electronic device is connected to the portable power source 100, the circuitry 118 generates a signal indicating such a connection and provides the signal to the microcontroller 102. Otherwise, a signal indicating such a connection is not provided to the microcontroller 102.

In one particular example, the circuitry 118 cooperates with complementary circuitry nominally present in the electronic device. That is, it is assumed that, the electronic device includes complementary circuitry in which the chassis ground and digital ground are connected. At the microcontroller 102, when the electronic device having the complementary circuitry is not connected to the connector 110, the "connect" pin of the microcontroller 102 is normally pulled high (through a resistor to Vcc). When the electronic device having the complementary circuitry is connected to the connector 110, the "connect" pin of the microcontroller 102 is pulled to digital ground.

Circuitry 116 is low power detection circuitry. Circuitry 116 evaluates the power available in the external batteries (connected to the terminal circuitry 104) and, when the available power falls below a particular threshold, generates a low-power indication signal to a reset input of the microcontroller 102. The thus-generated low-power indication signal holds the microcontroller 102 in a reset condition, resulting in the power generation circuitry 106 and 108 being controlled to cease generating power. This protects against the microcontroller 102 operating erratically due to a lower power condition, as well as minimizing the chance of damage (from leaking, for example) resulting from the external batteries being excessively discharged.

Figure 2:
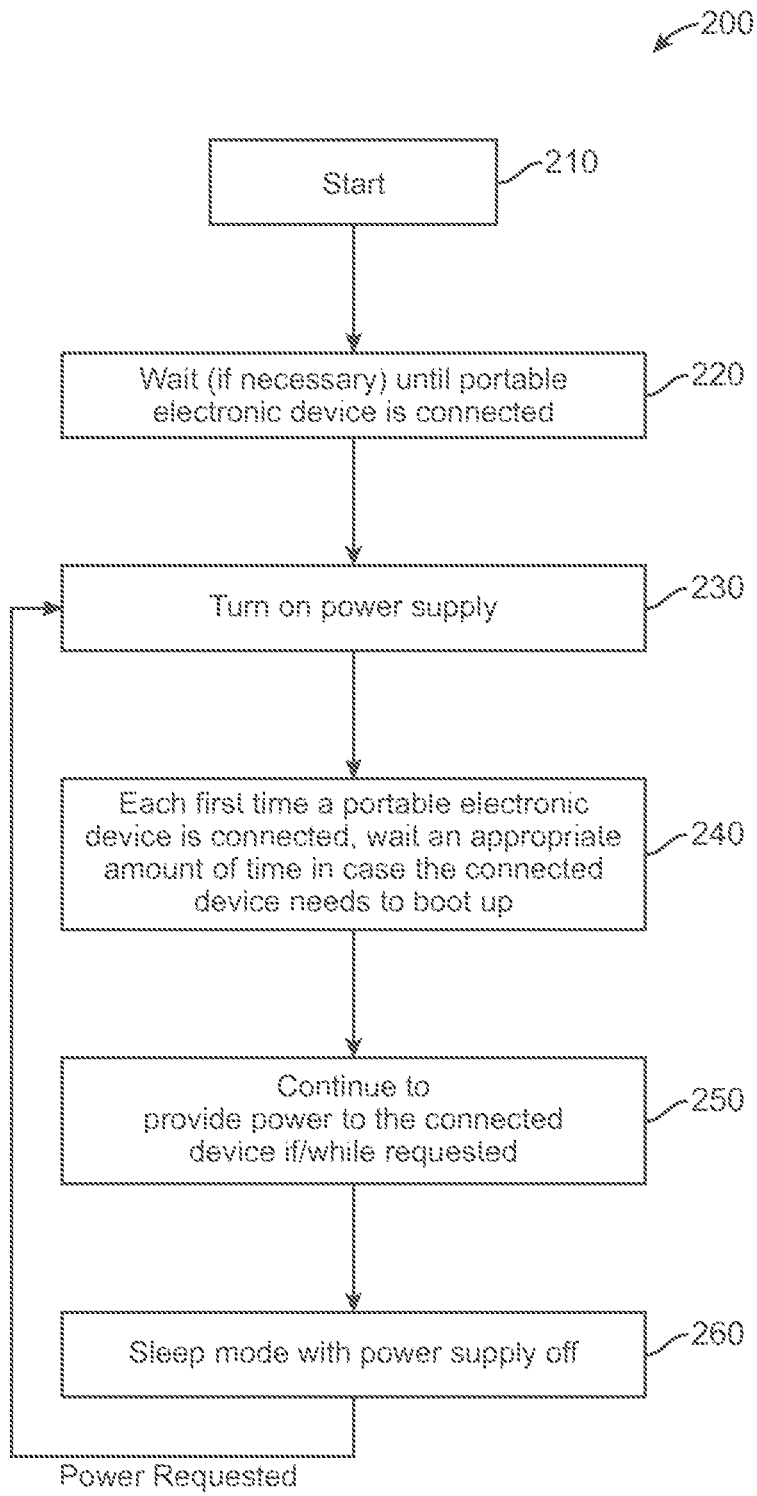
FIG. 2 illustrates a method implemented by a processor of the FIG. 1 portable power source.

Having described the circuitry of the portable power source 100 with reference to FIG. 1, we now refer to FIG. 2 to describe how the FIG. 1 portable power source 100 may operate in accordance with one example. In particular, program memory associated with the microcontroller 102 holds one or more programs which, when executed by the microcontroller 102, controls a process to operate the portable power source 100, including the interoperation of the portable power source 100 with a connected electronic device.

Referring to FIG. 2, a process 200 to operate the portable power source 100 is now described. The process stays at step 210 until external batteries are connected to the terminal circuitry 104. In step 210, the microcontroller is in an unpowered condition. When external batteries are connected to the terminal circuitry 104, the microcontroller 102 powers up, leaves a reset condition, and begins to execute program instructions.

At step 220, the microcontroller 102 waits (if necessary) for an electronic device to be connected to the connector 110. As discussed above, in the FIG. 1 example, circuitry 118 of the portable power source 100 generates a signal indicating such a connection and provides the indication signal to the "connect" input of the microcontroller 102. When step 220 is first reached, an electronic device may already be connected, in which case processing proceeds to step 230.

At step 230, the microcontroller 102 executes instructions to control the circuitry 106 and the circuitry 108 to provide the 5.0V and 1.9 V output, respectively. In one example, this comprises asserting an enable line from separate output pins of the microcontroller 102 to respective enable inputs of the respective power generation circuitry 106 and 108. In one example, the microcontroller 102 executes the instructions such that there is a time delay of 100 msec between controlling the circuitry 106 to provide the 5.0V output and subsequently controlling the circuitry 108 to provide the 1.0V output.

Step 240 is essentially a "waiting" step, and step 240 is executed only each time in the process 200 that step 220 is executed. In particular, at step 240, the microcontroller 102 executes instructions to wait an appropriate amount of time (for example, five seconds) for the connected electronic device to "boot up." This wait is to accommodate a connected electronic device whose internal battery may itself insufficient for the electronic device to be operating. In such a case, the connected electronic device has to rely on the power being provided from the portable power source 100 to boot up and to begin to operate.

Step 240 is typically executed only one time after an electronic device is determined to be connected at step 220 since, at this time, the state of the internal battery of the connected electronic device is unknown. Subsequently, when step 240 is reached, it is known that the connected electronic device is already booted up and operating, so step 240 is skipped in this instance.

While not shown explicitly in FIG. 2, at any time it is detected (typically, asynchronously) that the electronic device is no longer connected to the port of the portable power source 100, processing returns to step 220 to wait until the electronic device is again connected.

At step 250 (after waiting at step 240, as appropriate), the microcontroller 102 executes instructions to determine whether the connected electronic device is asserting a signal to indicate a request by the connected electronic device, processed by the circuitry 114 of the portable power source 100 (as discussed above), for power from the portable power source 100. Using the FIG. 1 example, the microcontroller 102 executes instructions to inspect the "request" input to the microcontroller 102.

As long the microcontroller 102 determined that the connected electronic device is requesting power from the portable power source 100, and assuming the power generation circuitry 106 and 108 is not disabled due to the low power detection circuitry 116 detecting a low power condition of the batteries (which, as discussed above, puts the microcontroller 102 into a reset condition, in one example), processing stays at step 250. While processing stays at step 250, the microcontroller continues to control the power generation circuitry 106 and 108 to provide power to the connected electronic device.

On the other hand, when the connected electronic device discontinues requesting power from the portable power source 100, processing goes to step 260. At step 260, the microcontroller 102 executes instructions to go into a "sleep mode." In the sleep mode, the microcontroller 102 executes instructions to disable the power generation circuitry 106 and 108, which conserves the charge in the external batteries. If the connected electronic device again requests power from the portable power source 100, then processing returns to step 230.

Having now described a process 200 to operate the portable power source 100, it is noted that, in a normal operating state, the operation of the power generation circuitry 106 and 108 is at the request of the connected electronic device.

Typically, a connected electronic device would not employ the portable power source 100 as a power source to charge the internal battery of the connected electronic device.

However, the configuration of the portable power source 100 does not prevent the electronic device from employing the portable power source 100 in such a manner. In fact, in some examples, such as a particular example of a portable media player, the electronic device is designed to preserve certain information in its internal memory even when "powered off." Such information may include, for example, an indication of which song was playing when the electronic device was powered off. The electronic device requires a minimum amount of power to its internal memory to preserve the information. Thus, the electronic device may employ a small amount of power from the portable power source 100 to raise its internal battery to a minimum level of charge, to power its internal memory to preserve the information.

The various described aspects, examples, implementations or features can be used separately or in any combination.

The invention is preferably implemented by hardware, software or a combination of hardware and software. As an example, processing of certain signals may be accomplished in some cases by polling a signal state and, in other cases, using a combination of interrupt hardware and interrupt handler software.

The software can be embodied as computer readable code on a computer readable medium. The computer readable medium is any data storage device that can store data that can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

One example of an ornamental design for a portable power source is provided in U.S. Design Pat. Application No.: D/220,037, filed Dec. 23, 2004, entitled "BATTERY PACK," which is hereby incorporated herein by reference.

The advantages of the invention are numerous. Different aspects, embodiments or implementations may yield one or more advantages. One advantage that an embodiment of the invention may have is that an electronic device may be conveniently powered using a portable power source.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A power source comprising:
   an interface;
   power generating circuitry operatively coupled to generate and provide power to an electronic device via the interface; and
   control circuitry configured to:
      control the power generating circuitry to generate and provide power to the electronic device during a waiting step so as to allow the electronic device to boot up-and begin operating by loading and initializing an operating system of the electronic device,
      wherein the waiting step comprises a predetermined length of time, and wherein the power generating circuitry is controlled to not generate power after the waiting step unless a request signal is received from the electronic device.

2. The power source of claim 1, wherein the control circuitry is further configured to cause the power generating circuitry to generate and provide power to the electronic device during the waiting step based on an indication of a connection to the electronic device.

3. The power source of claim 1, wherein the control circuitry is further configured to control the power generating circuitry to generate and provide power to the electronic device during the waiting step only when the electronic device is first connected.

4. The power source of claim 1, wherein the control circuitry is further configured to make an initial determination that the electronic device is connected to the interface of the power source.

5. The power source of claim 4, wherein the control circuitry is further configured to:
   determine whether the electronic device is no longer connected to the interface of the power source; and
   based on determining that the electronic device is no longer connected to the interface of the power source, control the power generating circuitry to refrain from generating and providing power to the electronic device.

6. The power source of claim 1, wherein the power generating circuitry is configured to provide two different voltages to the electronic device.

7. The power source of claim 6, wherein the power generating circuitry includes a 5 volt power generating circuit and a 1.9 volt power generating circuit.

8. The power source of claim 7, wherein a time delay between providing the 5 volt power and providing the 1.9 volt power is about 100 ms.

9. The power source of claim 6, wherein the power generating circuitry is configured to provide a first voltage of the two different voltages to the electronic device before providing a second voltage of the two different voltages to the electronic device.

10. The power source of claim 9, wherein a time delay between the first voltages and the second voltage is predetermined.

11. The power source of claim 10, wherein the predetermined time delay between providing the first voltage and providing the second voltage is about 100 ms.

12. The power source of claim 1, further comprising terminal circuitry configured to receive power from a portable source of power and to supply power to the power generating circuitry.

13. The power source of claim 12, wherein the portable source of power includes replaceable batteries.

14. The power source of claim 1, further comprising a cable detachably coupled to the interface.

15. The power source of claim 1, wherein the electronic device is operable to receive power from an internal battery when the electronic device is connected to the interface.

16. The power source of claim 1, wherein the request signal is received via the interface of the power source.

17. A method of operating a power source having control circuitry and power generating circuitry, the method comprising:
   controlling the power generating circuitry to generate and provide power to an electronic device during a waiting step so as to allow the electronic device to boot up, the power being provided to the electronic device via an interface of the power source, wherein the waiting step comprises a predetermined length of time; and
   controlling the power generating circuitry to discontinue providing power to the electronic device after the waiting step if a request signal is not received from the electronic device; and
   controlling the power generating circuitry to continue providing power to the electronic device if a request signal has been received from the electronic device during the waiting step.

18. The method of claim 17, wherein the request signal is received via the interface of the power source.

19. The method of claim 17, wherein the power is generated in response to a connect signal indicating a connection to the electronic device.

20. The method of claim 17, wherein the power generating circuitry is controlled to generate and provide power to the electronic device during the waiting step only when the electronic device is first connected.

21. The method of claim 17, further comprising making an initial determination that the electronic device is connected to the interface of the power source.

22. The method of claim 21, further comprising:
    determining whether the electronic device is no longer connected to the interface of the power source; and
    based on determining that the electronic device is no longer connected to the interface of the power source, controlling the power generating circuitry to refrain from generating and providing power to the electronic device.

23. The method of claim 17, further comprising:
    the power generating circuitry generating two different voltages; and
    providing the two different voltages to the electronic device.

24. The method of claim 23, wherein the two different voltages are 5 volts and 1.9 volts.

25. The method of claim 23, wherein the two different voltages are a first voltage and a second voltage, and wherein the second voltage is provided to the electronic device with a time delay relative to when the first voltage is provided to the electronic device.

26. The method of claim 25, wherein the time delay is predetermined.

27. The method of claim 26, wherein the predetermined time delay is about 100 ms.

28. The method of claim 17, further comprising receiving power at terminal circuitry of the power source from a portable source of power and supplying power to the power generating circuitry.

29. The method of claim 17, wherein the request signal is sent from the electronic device when a charge of an internal battery of the electronic device is below a minimum level of charge.

30. A power source comprising:
    an interface;
    power generating circuitry operatively coupled to generate and provide power to an electronic device via the interface; and
    control circuitry configured to:
        control the power generating circuitry to generate and provide power to the electronic device during a waiting step so as to allow the electronic device to boot up wherein the waiting step comprises a predetermined length of time;
        control the power generating circuitry to stop providing power to the electronic device after the waiting step if a request signal is not received from the electronic device; and
        control the power generating circuitry to continue providing power to the electronic device if a request signal has been received from the electronic device during the waiting step.

31. The method of claim 1, wherein the power generating circuitry is controlled to discontinue generating power after the waiting step unless a request signal is received from the electronic device.

* * * * *